(12) United States Patent
Cruz et al.

(10) Patent No.: US 11,347,967 B2
(45) Date of Patent: May 31, 2022

(54) DATA ANALYTICS ON PRE-PROCESSED SIGNALS

(71) Applicant: Teraki GmbH, Berlin (DE)

(72) Inventors: Angel Cruz, Berlin (DE); Daniel Lampert Richart, Berlin (DE); Markus Kopf, Berlin (DE)

(73) Assignee: Teraki GmbH, Berlin (DE)

( * ) Notice: Subject to any disclaimer, the term of this patent is extended or adjusted under 35 U.S.C. 154(b) by 311 days.

(21) Appl. No.: 16/837,014

(22) Filed: Apr. 1, 2020

(65) Prior Publication Data
US 2020/0327369 A1   Oct. 15, 2020

(30) Foreign Application Priority Data

Apr. 11, 2019 (EP) .................................... 19168758

(51) Int. Cl.
*G06K 9/62* (2022.01)
*G06N 20/00* (2019.01)
(Continued)

(52) U.S. Cl.
CPC ......... *G06K 9/6249* (2013.01); *G06K 9/6259* (2013.01); *G06K 9/6288* (2013.01);
(Continued)

(58) Field of Classification Search
CPC .. G06K 9/6249; G06K 9/6259; G06K 9/6288; G06K 9/6269; G06N 20/00; G07C 5/008; G07C 5/0816; G06V 20/56
(Continued)

(56) References Cited

U.S. PATENT DOCUMENTS

| 8,489,403 B1 * | 7/2013 | Griffin | G10L 19/008 |
| | | | 704/229 |
| 9,092,692 B2 * | 7/2015 | Paiton | G06V 10/56 |
| | (Continued) | | |

FOREIGN PATENT DOCUMENTS

| EP | 2424117 A2 * | 2/2012 | .............. H03M 7/30 |
| EP | 2424117 A2 | 2/2012 | |
| | (Continued) | | |

OTHER PUBLICATIONS

Ji et al., "Incremental Online Object Learning in a Vehicular Radar-Vision Fusion Framework," IEEE Transactions on Intelligent Transportation Systems, vol. 12, No. 2, Jun. 1, 2011, 10 pages.
(Continued)

*Primary Examiner* — Mahendra R Patel
(74) *Attorney, Agent, or Firm* — Fletcher Yoder, P.C.

(57) ABSTRACT

A computer-implemented method and corresponding system for processing sensor data associated with a vehicle is provided. The sensor data may be compressed or encoded with a dictionary according to sparse approximation theory, resulting in a sparse representation of the sensor data. Processing may further comprise detecting an event associated with the vehicle, wherein an event may be an accident recorded by sensors of the vehicle providing the sensor data. The detection of the event may be based on processing of the sparse representation of the sensor data alone without decoding the sparse representation. The detection of the event may further employ machine learning methods trained to the detection of an event from the sparse representation of the sensor data, or a combination of sparse representations of sensor data originating from a plurality of vehicles or sensors.

12 Claims, 5 Drawing Sheets

(51) Int. Cl.
G07C 5/00 (2006.01)
G07C 5/08 (2006.01)

(52) U.S. Cl.
CPC ............ G06N 20/00 (2019.01); G07C 5/008 (2013.01); G07C 5/0816 (2013.01)

(58) Field of Classification Search
USPC ......................................................... 382/159
See application file for complete search history.

(56) References Cited

U.S. PATENT DOCUMENTS

| | | | | |
|---|---|---|---|---|
| 10,176,382 | B1 * | 1/2019 | Owechko | G06K 9/627 |
| 10,579,929 | B2 * | 3/2020 | Laukien | G06N 20/00 |
| 10,586,312 | B2 * | 3/2020 | Rijnders | H04N 19/149 |
| 2006/0241916 | A1 * | 10/2006 | Sieracki | G10L 15/02 |
| | | | | 704/E11.001 |
| 2019/0095787 | A1 * | 3/2019 | Kung | G06K 9/6255 |

FOREIGN PATENT DOCUMENTS

| | | | | |
|---|---|---|---|---|
| GB | 2424117 A | * | 9/2006 | ............ G10L 19/18 |
| WO | 2016/040082 A1 | | 3/2016 | |
| WO | WO-2016040082 A1 | * | 3/2016 | ............ G01D 3/08 |
| WO | 2017/114579 A1 | | 7/2017 | |
| WO | WO-2017114579 A1 | * | 7/2017 | ............ G06K 9/28 |
| WO | WO-2017205850 A1 | * | 11/2017 | ............ G06N 20/00 |
| WO | WO-2019067265 A1 | * | 4/2019 | ............ G06N 3/04 |

OTHER PUBLICATIONS

Al-Jawad et al., "Comperession-based Technique for SDN Using Sparse-Representation Dictionary," IEEE/IFIP Network Operations and Management Symposium, Apr. 25, 2016, 6 pages.

Extended European Search Report for EP19168758.1 dated Oct. 8, 2019, 10 pages.

* cited by examiner

DATA ANALYTICS ON PRE-PROCESSED SIGNALS

CROSS-REFERENCE TO RELATED APPLICATIONS

This application is a Paris Convention filing of European patent application no. 19168758.1, entitled "DATA ANALYTICS ON PRE-PROCESSED SIGNALS", filed on Apr. 11, 2019, and claims priority to that application, which is hereby incorporated by reference in its entirety.

Data Analytics play an increasingly important role in vehicle or transportation applications, such as automotive applications. The following relates to a device and method for using compressed signals from sensors in a vehicle, such as a car, truck, shuttle bus, train or any other rail road based vehicle, suspension railway, air-plane, watercraft, ship, drone, or spacecraft. The vehicles may be autonomously operating/driving, such as a self-driving car, robot car, driverless car, or a non-autonomously operating/driving vehicle that has a human operator/driver.

Both the amount of data generated in a vehicle and the spectrum of analytics tasks which can be performed with this data is rapidly expanding. In many scenarios data generated in a vehicle (for example car) is transmitted to a remote computing environment (hereafter: cloud, or cloud computing environment) and analyzed there. However, this scheme quickly leads to problems, such as: increasing data volumes make it costly or even impossible to send a significant part of recorded data to the cloud. An obvious solution for this problem is data compression. A metric used to evaluate various data compression algorithms is a reduction rate or (just) reduction. The reduction rate R can be calculated as R=1-(compressed data volume/raw data volume).

Although many compression algorithms exist, they suffer from two main drawbacks. Firstly, high reduction rates can usually be achieved only with lossy compression: an algorithm introduces a certain amount of error into the compressed signal and the reconstructed/decompressed signal deviates from the original one. Existing lossy compression algorithms provide no guarantied bound on the reconstruction error needed for data required to update own models, which makes these algorithms unsuitable in safety-critical (automotive) transportation applications. Moreover, fixed transformation based schemes based on DCT or Wavelet transformation do not allow to obtain the required accuracies when running a machine learning method based on compressed data. Secondly, the data usually has to be decompressed before applying analytics Algorithms. This has adversary effects on the hardware requirements and computational time, mostly related to the synchronization of data and models between a client and server environment or between an edge computing device and a central computation unit deployed e.g. in a car.

SUMMARY

According to an embodiment, a computer-implemented method for processing sensor data is provided. The method comprises receiving sensor data from a sensor associated with a vehicle. The sensor data may comprise a plurality of data values. In addition, the method may comprise determining a sparse representation of the received sensor data using a sparse-approximation technique. The sparse-approximation technique may use a dictionary and an error control parameter. Determining the sparse representation may comprise: generating candidate sparse representations of the sensor data based on the dictionary; selecting one of the candidate sparse representations as the sparse representation, wherein the selected candidate sparse representation meets a criteria. The criteria may be that each of the error differences between the data values of the sensor data from corresponding decoded data values of the selected candidate sparse representation meets the error control parameter. In addition, the method may comprise detecting an event from the (determined) sparse representation.

According to a further aspect of the computer-implemented method, each error difference is calculated as an absolute value of a difference. This means, that the absolute value of the difference between two data values may be considered.

According to a further aspect, the computer-implemented method further comprises determining the corresponding decoded data values of the selected candidate sparse representation by decoding the selected candidate sparse representation with the dictionary.

According to a further aspect, detecting the event from the sparse representation may comprise computing a reduction rate of the sparse representation with respect to the received sensor data and and detecting the event, when/if the reduction rate does not meet a threshold value.

According to a further aspect, detecting the event from the sparse representation may comprise extracting a feature vector from the sparse representation of the sensor data. According to a further aspect, the method may further comprise applying a prediction model to the feature vector. A margin may be computed and compared to a threshold margin. According to a further aspect, the method may further comprise detecting the event, when the computed margin exceeds the threshold margin. According to a further aspect, the method may further comprise labelling the sensor data or the sparse representation according to a classification of the prediction model.

According to a further aspect, detecting the event from the sparse representation further may comprise providing the sensor data to a remote computing environment (as training data), upon labelling the sensor data. Additionally or alternatively, the method may comprise providing the sparse representation to a remote computing environment (as training data), upon labelling the sparse representation.

According to a further aspect, the sparse representation comprises a plurality of reduced coefficients. According to a further aspect, detecting the event from the sparse representation comprises detecting the event, when a combination of the reduced coefficients of the sparse representation meets a criterion indicating an anomalous event of the vehicle or condition of the vehicle. The criterion may be that one or more reduced coefficients exceed a threshold value, or that a combination of the reduced coefficients exceeds a threshold value.

According to a further aspect, the computer implemented method may comprise, upon detecting the event from the sparse representation, providing the sensor data or sparse representation to a remote computing environment as training data. The method may further comprise determining a new dictionary based on a training data set including the training data by using a dictionary learning scheme. The method may further comprise distributing the new dictionary to one or more vehicles.

According to a further aspect, a sensor data processing system for a vehicle is provided. The system may comprise means for receiving sensor data from a sensor associated with the vehicle. The sensor data may comprise a plurality of data values. The system may additionally or optionally comprise further means for determining a sparse representation of the received sensor data using a sparse-approximation technique. The sparse-approximation technique may use a dictionary and an error control parameter. Determining the sparse representation may comprise generating candidate sparse representations of the sensor data based on the dictionary. Determining the sparse representation may further comprise selecting one of the candidate sparse representations as the sparse representation. The selected candidate sparse representation may meet a criteria. The criteria may be that each of the error differences between the data values of the sensor data from corresponding decoded data values of the selected candidate sparse representation meets the error control parameter. The system may optionally comprise means for detecting an event from the sparse representation. The system may optionally comprise means for controlling the vehicle upon receiving an indication of an event.

According to a further aspect, the sensor data processing system for a vehicle, further comprises means for providing the sensor data or sparse representation to a server (as additional training data), upon detecting the event from the sparse representation. Optionally, the system may further comprise a server adapted to determine a new dictionary based on a training data set including the provided training data by using a dictionary learning scheme. The system may optionally be adapted to distribute the new dictionary to the vehicle or one or more other vehicles.

According to a further aspect, a server for processing sensor-based data of one or more vehicles is provided. The server may be adapted to receive a sparse representation of sensor data associated with a vehicle. The sparse representation may be encoded with a dictionary according to a sparse approximation technique. The server may be adapted to determine a new dictionary based on a training data set using a dictionary learning scheme. The training data set may comprise the received sparse representation as training data. The server may be further adapted to distribute the new dictionary to one or more vehicles.

According to a further aspect, the server may be adapted to receive the sparse representation of sensor data from a first vehicle. The server may be further adapted to receive a second sparse representation of sensor data associated with a second vehicle. The second vehicle may be different from the first vehicle. The server may be further adapted to detect an event from a combination of the received sparse representation of sensor data associated with first vehicle and the received sparse representation of sensor data associated with the second vehicle. According to a further aspect, determining of the new dictionary is further based on the detected event.

DETAILED DESCRIPTION

The present invention relates to data analytics on compressed signals and sparse dictionary learning. Sparse dictionary learning is a representation method aiming at finding a sparse representation (=compressed signal) of input data.

In the following pre-processing scheme/algorithm, an (encoding) dictionary may be used for compressing raw (sensor) data, resulting in compressed data. The raw sensor data may be referred to as a signal vector. A signal (=raw input data from a sensor) may be encoded with an (encoding) dictionary, resulting in compressed data, the compressed data may be referred to herein as a compressed signal (vector). In the following, the terms "compressing a signal with a (encoding) dictionary" and "encoding a signal with the (encoding) dictionary" are used as having the same meaning. Likewise, the terminology "decompressing a signal with the dictionary" and "decoding a signal with the dictionary" have the same meaning. The same dictionary may be used to decompress the compressed signal vector into a decompressed/decoded signal vector. The dictionary may be represented as a matrix, for example a matrix with square shape. The same dictionary may be used to process (i.e. compress/decompress, or encode/decode) digital signals of different types of sensors. For example, the same dictionary D may be used to find a compressed signal vector for a data signal from a gyroscope and another compressed signal vector for another data signal from an accelerometer. That is two different sensors may share or be processed with the same (encoding) dictionary, although the type of signal which the sensors measure are different (e.g. temperature sensor and humidity sensor). Alternatively, a separate dictionary may be associated for processing input data of different types of sensors. For example, a first dictionary may be used to process a (digital) signal of a first sensor, while another dictionary is used to process the input data of another type of sensor.

The dictionary may be obtained from a (sparse) dictionary learning procedure. In this learning procedure, training data is fed into the procedure, which then outputs a dictionary that may be used to compress raw sensor data, i.e, a (digital) signal (in real-time). Likewise, the dictionary allows decompressing a digital signal compressed with that dictionary. Such decompression is equivalent to reconstructing the corresponding original signal of the compressed signal.

Sparse dictionary learning is a representation learning method which aims at finding a sparse representation of the input data in the form of a linear combination of basic elements. These elements are called atoms and they compose a dictionary. Atoms in the dictionary are not required to be orthogonal to each other, and they may be an overcomplete spanning set. Where the dictionary is represented as a matrix, the atoms of the dictionary are the columns (or column vectors) of the dictionary matrix. The aforementioned properties lead to having seemingly redundant atoms that allow multiple representations of the same signal but also provide an improvement in sparsity and flexibility of the representation.

The compression of a digital signal according to a sparse approximation theory/technique is described in the following. A digital signal to be compressed may be represented as a finite-length vector. For example, it may be an N-dimensional vector x (N denoting the length of the vector). A dictionary D for compressing (or encoding) the digital signal vector x may be an N times N dimensional matrix. The compression routine may then try to represent x as D times y, wherein y is a sparse N-dimensional vector, ideally as sparse as possible, which means that only a few atoms/columns from the dictionary D are used in a linear combination to represent y. y is also called the sparse representation. The sparse representation comprises components, elements, or reduced coefficients. In other words, the sparse representation y=arg min$\|y'\|_0$, wherein $\| \|_0$ denotes the $l_0$0-norm, y' denotes a candidate sparse representation. As indicated above, the product of the dictionary D with the sparse representation y is the decoded/decompressed/reconstructed signal $x_r$, which is an approximation of the input signal, the digital signal (vector) x. $x_r$ may comprise decoded data values (which correspond (one to one) to the data values of the input signal (sensor data).

In addition, a constraint may be used to further formulate the minimization problem for finding compressed data, i.e. a sparse representation y (=the compressed signal vector y). This constraint may be that the difference between x and D times y is minimal according to a norm, such as the $l_0$-norm, $l_1$-norm, $l_2$-norm or $l_\infty$-norm, and optionally with respect to an error control parameter E, e.g. $\|x < D \cdot y\|_p < E$, wherein p may be 0, 1 2, or ∞. By representing the (original) digital signal vector x as sparse as possible using the dictionary, the compressed signal vector y, while having the same length N as the original digital signal vector x, contains more zero elements/components which results in a reduction (by increasing the number of redundant components of the signal vector; even conventional data transfer method can benefit from this redundancy). Methods for finding the compressed signal vector y are available from sparse approximation theory, which provides many sparse approximation techniques (such as: matching pursuit, orthogonal matching pursuit, greedy methods, basis pursuit, or iterative hard-thresholding, and many more).

Sparsity of y implies that only a few (k<<N) components/elements in it are non-zero. The underlying motivation for such a sparse decomposition/representation is the desire to provide the simplest possible explanation of the original signal (vector) x as a linear combination of as few as possible columns from the dictionary D. As indicated above, a column of a dictionary D may also be referred to as an atom.

A reduction rate for the compression may also be defined as: R=(number of zero components of y)/(length of y), wherein y is the compressed signal vector.

The benefits of using this compression (encoding) scheme is that an analytics ask may be performed directly on the compressed signals without decompression (decoding).

Using the $l_\infty$-norm in the constraint of the minimization problem may be beneficial for improving the quality/fidelity of the compressed signals and allows tuning accuracy rates of the machine learning methods applied on the sparse representation comprising the reduced coefficients. The $l_\infty$-norm may impose a hard constraint on an absolute value of the maximum deviation of the decoded/reconstructed signal D·y (wherein D times y is the product of the dictionary matrix D and the sparse representation/compressed signal vector y) with respect to the original signal vector x. In other words, the error control parameter E may control how large the largest (error) difference/deviation between two corresponding components of the original signal vector x and the reconstructed signal D·y may be.

(Data) Analytics may be performed using compressed data from the above encoding scheme, i.e., the compressed signal vector y. Analytics may be performed directly in the vehicle where the data was generated or after the data is transferred to a remote computing environment (such as a (remote) server, or a cloud computing environment) at this destination. The resulting reduced coefficients may be used to determine a range of features which are useful identify within a specific confidence interval of a specific labelled object. The confidence interval for example for a specific detection rate may be determined accurately based on the choice of the boundary condition of the $l_\infty$-norm.

The first way has more benefits: it is faster (which is relevant, for example, if it is desired to identify traffic accidents within a specific confidence interval) and cheaper, because it does not require transferring large volumes of data from the vehicle to a remote computing environment or between various computing devices within the car. However, embedded devices, which are typically used in a vehicle, often have restricted computational resources. This limits the range of possible analytical tasks. In practice, complex analytics tasks are performed faster on a remote computing environment (remote server)—not in the vehicle. In this case, the aforementioned compression routines with a dictionary may be used to achieve a reduction of the transferred data volume. Additionally, the compressed data can be used for event detection without sending the (compressed or raw) data to a remote computing environment (such as a central sensor fusion unit where an event is detected by combining triggers arising from various received compressed data streams of different sensors of one or more vehicles). Moreover, the reduced coefficients (of the sparse representation) could be already used to identify a specific object with a specific label and within a specific confidence interval, then use the data to ingest into a more computationally expensive perception stack fusing the reduced coefficients of a variety of different sensors in a central computation unit.

Figure 1A:
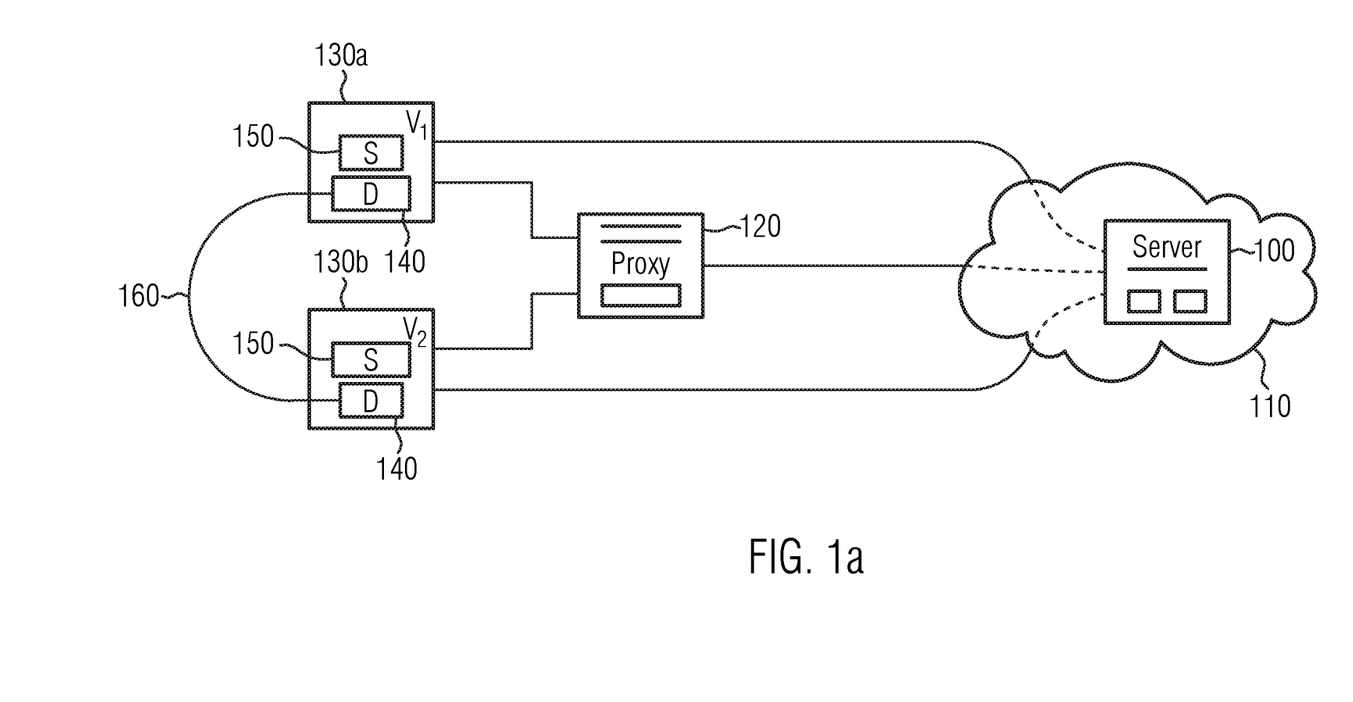
FIG. 1a illustrates a system in which embodiments of the invention may be implemented.

FIG. 1a illustrates a system, in which embodiments may be implemented. A server 100 in a remote computing environment 110 may be connected to one or more vehicles 130a-b. Each vehicle may be connected to another vehicle through a remote computing environment 110 or a communication proxy 120. A device 140 that implements the routines as discussed below may be installed, connected or otherwise integrated in a vehicle. The device 140 may be an embedded device or embedded system as discussed below. Two vehicles in a fleet of devices can communicate with each other: Either directly from vehicle to vehicle (V2V) 160, or via a proxy 120, such as a remote computing environment 110 (cloud computing), or a combination of both ways is possible.

Some or all of the embodiments disclosed herein may be implemented by an electronic device 140 connectable/connected to a vehicle. The device may also be implemented as an integral component of the vehicle. Alternatively, the device may be a portable device that is used with the vehicle, similarly to how portable navigation systems are used in cars. The device may be (temporarily) mounted to or installed in the vehicle. Furthermore, the device may be an embedded system as discussed below. The device may be connected through wires, wirelessly, optically, a bus, or any other means with the vehicle.

A sensor 150 may be included in a vehicle 130a/130b. Sensors 150 in a vehicle may be connected to the device 140, e.g. an embedded system. The embedded system may then record/acquire signals from the sensors built-in in the vehicle. Such built-in sensors may be a pressure sensor indicating pressure in tires of a car, the relative velocity/acceleration of specific moving parts in a car or a height sensor in a drone, etc. Alternatively or in addition, the device 140 (embedded system) may include (its own) sensors that provide signals about the operation of the vehicle (e.g. gyroscope, accelerometer,) or the environment (location sensor, temperature sensor, humidity sensor, ice-detection sensor, etc. To implement some of the routines discussed below an embedded system may be used. Alternatively, a general-purpose computer (e.g. laptop, tablet computer) may be used in place of an embedded system.

According an aspect of the invention, the (electronic) device 140 may be a dangle box connected/attached to a vehicle (e.g. car). The device may be used to compress signals from the sensors of the vehicle and/or signals from sensors in the device. In addition, the device may analyze the (compressed) signals of the sensors. The device may determine from the (compressed) signals that an anomaly in the operation of the vehicle is detected/present. This anomaly may be an accident that happened, an indication that a portion of the vehicle is malfunctioning and that the vehicle needs maintenance, the energy supply (battery, fuel) of the vehicle is low (on power) and needs charging/replacement/refill, the amount/level of a fluid (e.g., oil) in a suspension system of the vehicle is insufficient, or other examples. In the example of an insufficient fluid level in the suspension system, this situation can be detected by a sensor providing direct information of the pressure level in the suspension system. However, this situation may also be detected from other types of sensors, too, such as an accelerometer. In this case, the sensor data of the accelerometer may indicate abrupt changes in the acceleration, which would normally not happen, when the suspension system is operating correctly (and not malfunctioning).

According to an embodiment, the device may gather or collect sensor data from sensors in the vehicle, where the device is installed/attached. The sensor data may be analog signals that the device may convert to digital signals, for example by using an analog-to-digital-converter. The sensor data received from a sensor may be a digital signal. The device may receive one sensor datum/value at a time and aggregate multiple sensor values into a signal or signal vector that has a finite length. The device may collect time series from a sensor in/of the vehicle. A time series may be a series of data points and indexed in time order. For example, a time series may be represented as a signal vector x with finite length N. Each element/component of that signal (vector) x may correspond to a sensor datum/value measured at a different point in time. The sensor data is sampled (and thus converted into a digital signal) with a sampling frequency/rate f (defined in Hertz). The inverse of the sampling rate may be the sampling period and may define separation in time of two subsequent sensor values in a signal vector.

According to a further optional aspect, the device 140 in the vehicle may monitor or track the incoming sensor data with a threshold-based algorithm to determine, if any of the sensor values deviates strongly from a normal range. For example, the device may determine whether a sensor value exceeds or falls below a threshold value k. If so, this may indicate that an anomaly/incident is present, such as an accident or any of the other example of events discussed above. The device may then be triggered to store sensor data (for example time series data) of a predefined time interval around the suspected anomaly. Such an anomaly detection scheme enables to provide a first redundancy to the detection scheme of the edge detection scheme described here. For example the device may store 8 seconds around a suspected event and determine through a subsequent step if the accident happened within a specific confidence interval. Such sensor data may then be sent to a remote computing environment 110 or server 100.

According to a further aspect, the device may perform classification on the sensor data, before sending the sensor data to a remote computing environment as training data or taking any other action. If the sensor data is to be sent as training data, classifying an event may help to reduce the number of incidents reported falsely as anomalies to the remote computing environment. In other words, the number of false-positives may be reduced in the training data set which may help to reduce the number of manual work to verify true anomalies from false anomalies and at the same time reduces network traffic. In the same way, the scheme might be trained to detect and transmit abnormal events in at the raw increased data rate, enabling to train a suited prediction scheme of such an abnormal event.

According to an aspect of the present invention, training data may be used to find an encoding dictionary. The decision to send out raw data could be based on determining that the registered event was due to an abnormal event, as determined by the detection scheme described before. Training data could be cumulated over events triggered by the same detection scheme over subsequent points of time or over a fleet of different devices. The training data may comprise uncompressed signals from the sensors. The signals may be from different types of sensors, resulting in a heterogeneous training data set. Alternatively the training data may be comprised of uncompressed from the same type of sensor, resulting in a homogeneous training data set. In any case, an encoding dictionary may be searched and found by solving an optimization problem as it is known from sparse approximation theory. The found dictionary may then be distributed to a device according to the present invention, where the device is used to compress/encode signals from the vehicle using the dictionary. The found dictionary may be shared/distributed to a fleet of vehicles. The fleet of vehicle need not to have the same set of sensors available to share/use the same dictionary.

Figure 1B:
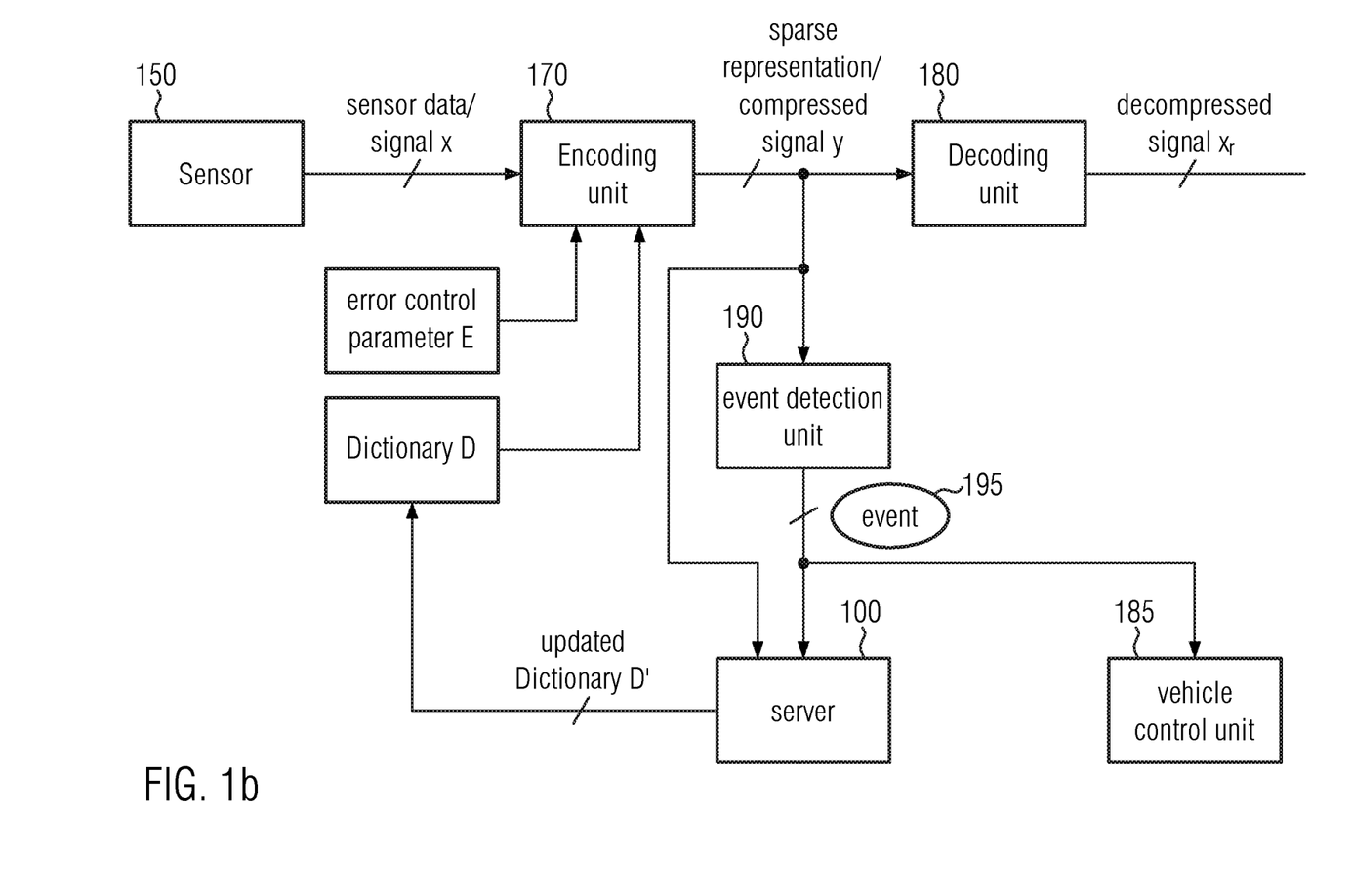
FIG. 1b illustrates processing units involved in the flow of signals for detecting events from compressed signals.

FIG. 1b illustrates processing units involved in the system of FIG. 1a and the flow of signals for detecting events from compressed signals. While it is widely known that an event associated with sensor data may be detected from decompressed/decoded or raw sensor data, it is also possible to detect an event based on compressed sensor data—without decompressing the compressed sensor data. Such processing has the benefit that the decompression of sensor data may be omitted and that bandwidth is saved at the same time, since the processing of the event detection is based on the compressed data instead of the raw sensor data or decompressed/uncompressed data.

The sensor 150 may provide sensor data, e.g. raw sensor data, to an encoding unit 170. The encoding unit 170 (or compression unit) may receive (raw) sensor data from the sensor 150 and then process the sensor data. The encoding unit 170 may process the sensor data (signal x) with an encoding dictionary D so as to represent the raw sensor data in a sparse form, using one of the sparse approximation techniques mentioned above. The sparse approximation technique of the encoding unit in use may also be configured, set, or changed based on a user setting. Processing the sensor data x with the dictionary D may result in a compressed signal (vector) y, which may then be passed to the event detection unit 190 or a remote computing environment. The encoding unit 170 may be integrated into the vehicle 130a (which is associated with the sensor). Alternatively, the encoding unit 170 is included in the device 140, and/or may be implemented as hardware logic or software logic. In addition, the system may comprise a event detection unit 190. The event detection unit 190 may use the compressed signal y received from the encoding unit to detect an event 195 (i.e. an anomaly in the sensor data). Optionally, the event detection unit 190 may further receive the sensor data (signal x) in addition to the sparse representation. Optionally, the system may further comprise a decoding unit 180, which is included in the remote computing environment 110 or the server 110. The decoding unit 180 may receive the compressed signal y from the vehicle 130 or the device 140. Further, the decoding unit may use the corresponding dictionary D to decompress/decode the sparse representation/signal y, yielding a reconstructed/decoded/decompressed signal $x_r$. Optionally, the system further comprises a vehicle control unit 185. The vehicle control unit 185 may be integrated in the vehicle or external to the vehicle (such as implemented in the server). Optionally, the vehicle control unit 185 may be part of the device 160. The vehicle control unit optionally receives an indication of an event 195, sensor data, or a sparse representation of the sensor data. In response to receiving a combination of the aforementioned data, the vehicle control unit may issue a control command to change the operating mode of the vehicle associated with the received data.

In the following, details of the processing steps in the encoding unit 170 are illustrated. The encoding unit 170 may determine a sparse representation of the sensor data according to a sparse approximation technique. The encoding unit 170 receives an original signal (vector) x (i.e. raw sensor data from the sensor 150). The signal x may have a finite length N. If the x is represented as a vector the length N denotes the length of the vector. The encoding unit 170 may attempt to find a compressed signal y using an encoding dictionary D and an error-control parameter E. The compressed signal y may be a sparse representation of the original signal x. For this, the encoding unit 170 may use an optimization algorithm that attempts to find an optimal solution to the constrained optimization problem y=arg min $\|y'\|_0$; wherein $\|x-D\cdot y'\|_p < E$, where E is the error-control parameter, P may be 0, 1, or $\infty$, and y' is a candidate for the compressed signal y. y' may also be called a candidate sparse representation. Sparse approximation techniques (such as: matching pursuit, orthogonal matching pursuit, greedy methods, basis pursuit, or iterative hard-thresholding) can be used to find a compressed signal y for the original signal x, the encoding unit may start with a first candidate compressed signal y', which may have the same length as the original signal x. In other words, y' has also N elements. The encoding unit may then determine whether the candidate compressed signal y' meets stop criteria for terminating the search. If the candidate compressed signal y' meets the stop criteria, it will be output as the compressed signal y. Otherwise, a new candidate compressed signal y' will be generated and the procedure for finding a suitable compressed signal y will be iterated until the stop criteria are met. A first stop criteria may be that the candidate compressed signal y' is sparse enough, meaning that the number of non-zero elements (=reduced coefficients) in the signal vector y' is below a threshold value Z. The value of Z may be predefined or dynamically set, so that it adapts with the sparsity of candidate compressed signals y' from previous iterations. Another stop criteria may be that the deviation of the decoded signal $x_r$ from the original signal x falls below the error-control parameter E (The parameter E may be predefined and determined by trial-and-error). The decoded signal $x_r$ (also referred to as the decompressed signal or reconstructed signal) may be calculated using the encoding dictionary D and the candidate compressed signal y' as D times y'. The residuum/deviation $\Delta$ of the candidate reconstructed signal D times y' from the original signal can be computed using the $l_2$-norm as: the sum of the squares of the element-wise differences between the signal vectors x and $x_r$. As formula: $\|x-D\cdot y'\|_2 =: \Delta$. If $\Delta$ falls below the error-control parameter E, i,e. if $\Delta < E$, then one of the stop criteria is met for the encoding unit to stop the iterations for finding a final compressed signal that can be returned for the original signal x. Since the compressed signal y is not necessarily used for decompression, but rather for event detection based on the compressed signal, it is desirable that the compression of the original signal does not introduce artifacts into the compressed signal y that make using the compressed signal y less suitable for event detection. The $l_2$-norm as a stopping criterion may be blind to compression deviations that occur only for a few elements/data values of the entire sensor data (=signal vector). This may be unfavorable for detecting events in a signal, because typical footprints of an event are deviations for a few data points/values. To improve the information that a compressed signal y (which may be used for event detection) represents or reflects, the encoding unit 170 may use another norm in place of the $l_2$-norm. According to an embodiment, the deviation $\Delta$ of the candidate reconstructed signal $x_r$ =D times y' from the original signal x can be computed using the $l_\infty$-norm. As a formula: $\|x-D\cdot y'\|_\infty =: \Delta$. In this case, the deviation $\Delta$ is the absolute value of the maximum of component-wise (error) differences between the original signal x and candidate reconstructed signal $x_r$ (=D·y').

The benefits of using the $l_\infty$-norm (instead of the $l_2$-norm) are that the compressed signal y better reflects characteristics of an anomalous signal. Such information may be lost when using the $l_2$-norm instead, in which the deviation of the reconstructed signal $x_r$ from the original signal is computed as the sum of the squares of component-wise deviations. Using the $l_\infty$-norm instead for calculation the deviation of the reconstructed signal from the original signal guarantees that, for all data values in the reconstructed signal, the deviations from the original signal's data values is below the error control parameter E. As a surprising effect, the compressed signal also inherently reflects/includes this property or information, which makes such compression/encoding particularly useful to event detection.

The event-detection unit may apply event detection to the received signals, such as the sparse representation y and/or the sensor data (signal x). According to an embodiment, applying an event-detection to the sparse representation comprises detecting an event based on a reduction rate R, which may be computed as outlined in step 520 illustrated with respect to FIG. 5, or as a R=1−(compressed data volume/raw data volume). If the computed reduction rate R meets a criterion (e.g., R exceeds or falls below a threshold value $q_r$), this indicates that there may be an event/anomaly associated with the processed data (i.e., the sparse representation and/or the sensor data). Optionally, the sparse representation and/or the sensor data may be provided to a further event detection scheme to further classify the event, such as method 400 for making a prediction from a feature vector described further below. Additionally or alternatively, the reduced coefficients of the sparse representation may be assessed to detect an event. For example, an event may be detected, when one or more of the reduced coefficients meet a threshold criterion. In other words, if a coefficient $y_i$ of the sparse representation exceeds a threshold value z, an event may be detected. Additionally or alternatively, the sparse representation and/or the sensor data may be provided to the remote computing environment 110 or the server 100 as training data. The training data may then be employed in the dictionary learning method of process 200 to find an improved (encoding) dictionary that is more appropriate for encoding/compressing the characteristics of the event detected in the sensor data. As outlined below, the updated/resulting/determined dictionary may be distributed to one or more vehicles, including the vehicle from which the training data originated. The updated dictionary may be used instead of the (previous) dictionary by the encoding unit 170.

Optionally, the encoding unit 170, vehicle control unit 185, and/or event detection unit 190 may be included in the device 140.

Figure 2:
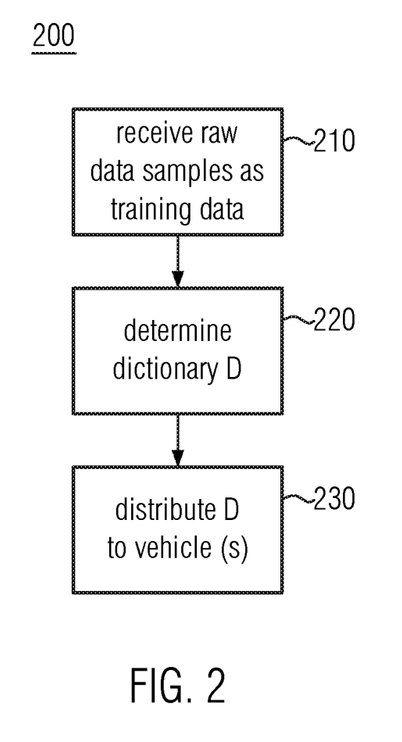
FIG. 2 illustrates a process 200 using a sparse approximation method to obtain and distribute a resulting dictionary.

FIG. 2 illustrates a process 200 using a dictionary learning method/scheme to obtain and distribute the resulting dictionary of the dictionary learning method to one or more vehicles. The method may be implemented by the remote computing environment 110 or server 100. The method may use a K-SVD algorithm (an algorithm for the design of overcomplete dictionaries for sparse representation). A suitable K-SVD algorithm is disclosed by RUBINSTEIN, Ron; ZIBULEVSKY, Michael; ELAD, Michael in Title: "Efficient implementation of the K-SVD algorithm using batch orthogonal matching pursuit", Technion, 2008. The disclosure of the aforementioned publication is incorporated herein by reference.

In step 210, a training module implementing a dictionary learning method/scheme, as discussed above, receives raw data samples from one or more vehicles, where the data samples were obtained from sensors. For example, a vehicle using a first sensor may provide its sensor data samples to the training module. The first sensor may be a gyroscope or an accelerometer. The raw sensor data may be a digital signal to be compressed, which can be represented as a finite-length vector. For example, it may be an N-dimensional vector x (N denoting the length of the vector). The received raw data of sensors from the one or more vehicles may be used as training data for the dictionary learning method. Alternatively or additionally, if portions of the training data samples are not provided as raw sensor data, but instead as a sparse representation of the sensor data, the sparse representation may be decoded/decompressed with the dictionary used for (en)coding the sparse representation, resulting in reconstructed/decompressed/decoded sensor data, which may be suitable for the dictionary learning method/scheme. In a next step 220, the training module determines a dictionary from the training data. For example, a dictionary D is determined from the received digital signals from the one or more vehicles (by using a known dictionary learning method). In a further step 230, the determined dictionary D may be distributed as a compression/encoding dictionary to one or more vehicles, wherein these vehicles may or may not comprise the vehicle/s from which the training data originated. A vehicle that received such compression/encoding dictionary may then activate the dictionary and may use it to encode/compress raw sensor data, i.e. original signal (vector) x, into a compressed signal (vector) y, as mentioned above.

Additionally, the dictionaries may be distributed over the network of vehicles (such as cars) and a distributed event detection scheme could be implemented over a fleet of vehicles. The distributed event detection scheme may be used to detect an anomalous event by using the joint sensor data from the plurality of vehicles in the fleet. An example for such an anomalous event could be a pothole in the road. Additionally alternatively, a training scheme of a new anomalous event could be initiated by registering an anomalous event through the distributed event detection scheme described before. Data streams (e.g. sensor data or sparse representation of the sensor data) of several seconds could be sent to a centralized processing unit (such as the remote computing environment 110 or the server 100) and used to train a novel dictionary. As result, an optimized dictionary may be obtained and provided to the vehicles (in the fleet) enabling each vehicle to detect the anomaly. In the same way, a new anomaly prediction scheme could be trained based on directly the encoded data in the same server and distributed subsequently over the fleet of cars. The direct benefit is a reduced detection time per car of the new event, but the cumulated detection time over the fleet of cars is reduced exponentially with the number of cars deployed in the fleet and traversing the same pothole within a specific amount of time.

Figure 3:
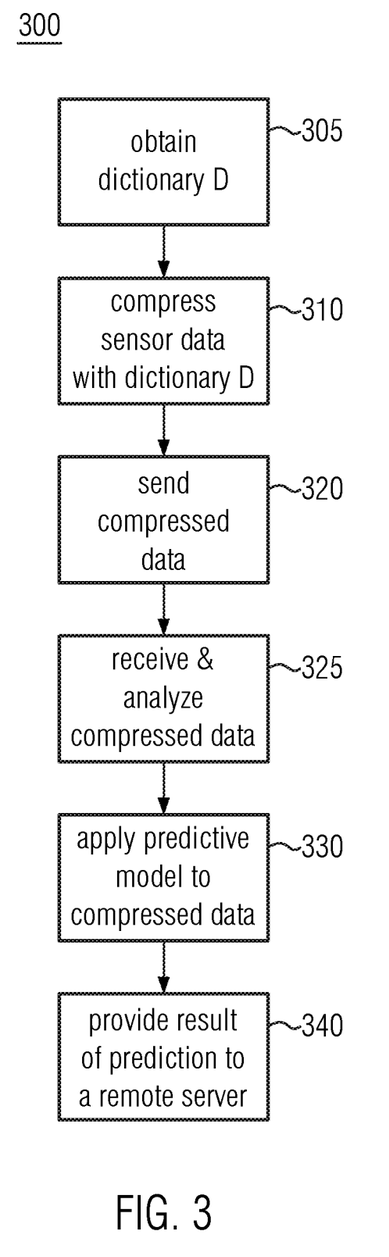
FIG. 3 illustrates a process/method 300 for compressing sensor data.

FIG. 3 illustrates a process/method 300 for compressing sensor data that may be performed after the distribution of a compression/encoding dictionary D to a vehicle. In a first step 305, the vehicle may obtain the dictionary D in step 230 of the above illustrated process 200 or by any of the dictionary exchange processes, discussed further below. The dictionary may be a matrix as discussed above.

The vehicle may generate raw data from a sensor (within access of the vehicle). The raw sensor data may be windowed into a block of N samples. The raw sensor data may be an original signal vector x (with finite length N). In a next step 310, the raw sensor data may be compressed/encoded with the dictionary D, resulting in compressed data (=sparse representation which may comprise reduced coefficients). For this, the error control parameter E may be set to a user-defined value suitable for high-fidelity in the compressed data. Likewise, the norm, such as the $I_0$-norm, $I_1$-norm, $I_2$-norm or $I_\infty$-norm may be set for encoding/compressing with the dictionary. The compressed data may be a compressed signal vector y, as illustrated above. In an alternative or additional step 320, the compressed data may be sent to a remote computing environment (for example cloud computing environment). There, in step 325, the compressed data may be stored, and if the compressed data becomes relevant in view of a triggering event, it may be analysed. Alternatively, in step 325, the compressed data received in the remote computing environment may be analysed (in any case). This may include reconstructing the original raw data from the compressed data. This may be achieved by decompressing/decoding the compressed data, e.g., by multiplying the compressed signal vector y (=compressed data) and the dictionary D. For this, the remote computing environment may obtain the corresponding dictionary, which is suitable for decoding/decompressing the compressed data in advance or with the compressed data. In a further step 330, a predictive model may be applied to the compressed data, for example, at the vehicle. The predictive model may be a model, which may be determined by Support Vector Machine model, as discussed above. Applying the predictive model to the compressed data may result in a prediction result. The prediction result may indicate whether an event has occurred. Such an event may be that an accident occurred, or that maintenance of the vehicle is needed, or that the operation of the vehicle needs to halt (for example, due to a sleeping driver/operator of the vehicle). In a next step 340, a remote computing environment, such as the one/same in step 320 or a different one, may be provided with the prediction result (a classification). In the next paragraph a non-exhaustive list of uses cases for sending data to a remote computing environment is given, wherein the sent data may be the prediction result or the compressed data, as in step 320.

For example, a fleet manager may use sensors in a vehicle to trace signals from the (electric) motor or engine of a vehicle (such as a bus or car) in order to determine whether the vehicle required maintenance soon. In another example, an insurance company, such as a car insurance company, may trace signals of a motor/engine of the vehicle for the purposes of predictive maintenance. In another example or in addition to the aforementioned examples, an insurance company may trace signals like acceleration, speed, wheel angle, braking, in order to track a customer's use of the vehicle, and/or evaluate a driving style of the customer, and/or offer discounts for drivers with a low risk profile. The same signal data may also be used for predictive maintenance purposes. In another example, a taxi driver may allow a third-party (i.e. some in addition to the driver's passenger) agency to collect signals from the sensor data characterizing the driver's driving style, which may be shared via an app with other potential customers of the taxi driver. In another example, a set of signals from a variety of sensors in a vehicle may be used to determine a state of mind (drunk, tired, sleepy) of the driver of the vehicle. If the driver's state of mind is in a risky condition, the operation of the vehicle may be altered. This alteration may comprise halting the vehicle, parking the vehicle, or issuing an alert/indication to the driver. In another example, signals from an accelerometer and/or a gyroscope can be traced to determine an accident and issue a request for first aid via telecommunication means, such as a telephone or the Internet. In another example, signals from a vehicle may be traced to identify moments with a high probability of an accident. Possible actions to mitigate such potential accident include alerting the driver of the vehicle, or taking over control of the vehicle, if it is a remote controllable vehicle. In another example, GPS information of a vehicle operating in a city can be traced to gather information about traffic jams and inform other vehicles/drivers. In another example, connected vehicles may communicate with each other and such a vehicle may inform another vehicle about road/traffic condition. This may be implemented by sending a message from one vehicle to another vehicle. The vehicle receiving the message may then alert the driver of the vehicle, or if it is an autonomously operating vehicle accordingly change its operation.

Figure 4A:
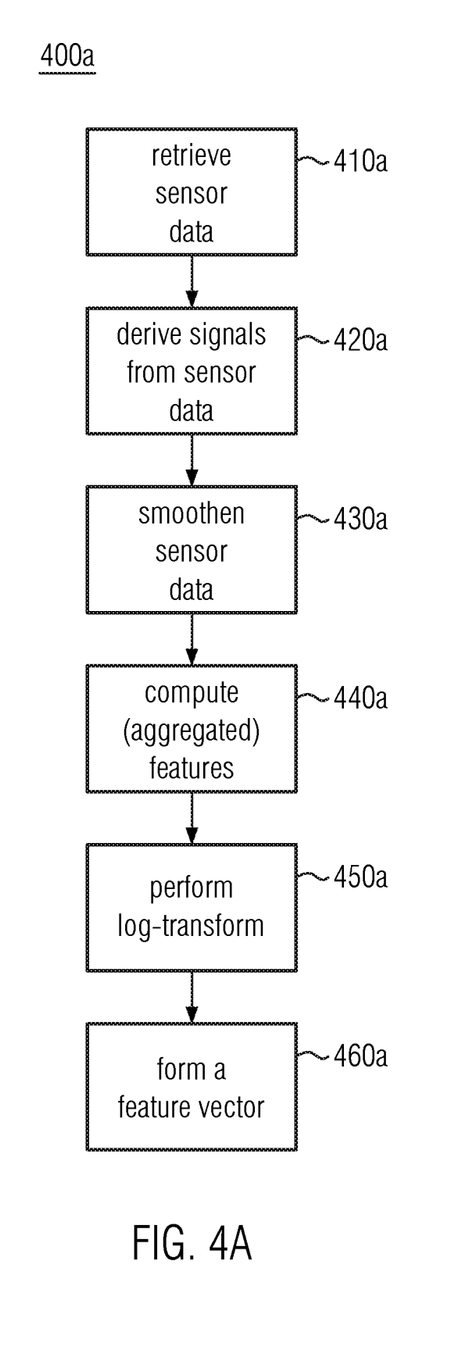
FIG. 4a illustrates a method for extracting a feature vector from compressed sensor data.
Figure 4B:
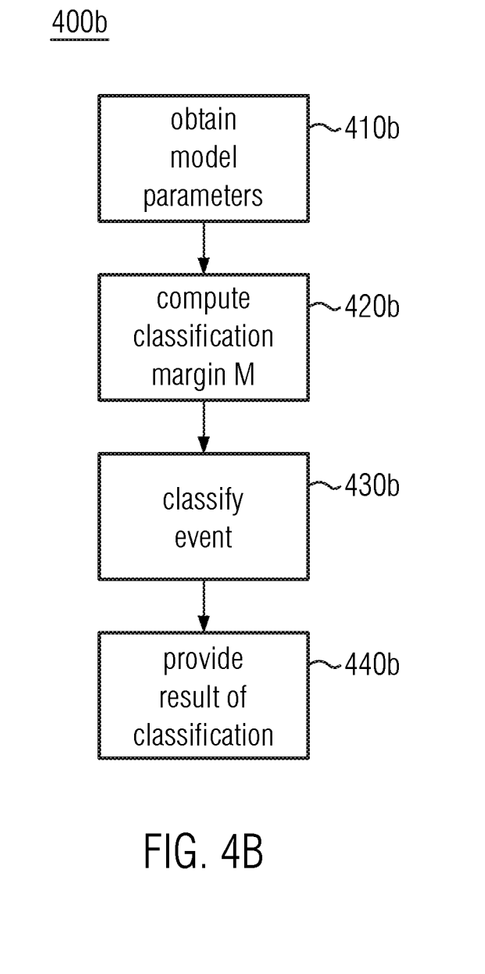
FIG. 4b illustrates a method for making a prediction from a feature vector.

FIGS. 4a and 4b illustrate processes for an inference procedure using the compressed data. A classifier based on a Support Vector Machine (SVM) model may be trained in a training phase resulting in model data/parameters that may be used in the inference procedure of the classifier. These model parameters may include (a vector of) of dual coefficients, an intercept term, a kernel parameter, a threshold value of a margin M0, (a vector of) feature means, (a vector of) feature standard deviations, and (an array of) support vectors.

FIG. 4a illustrates a method/process 400a for extracting a feature vector from compressed data.

In an initial step 410a, (compressed) sensor data may be retrieved. The sensor data (in this case the sensor data may be the sparse representation of the raw sensor data or the raw sensor data itself) may be retrieved upon determining that an event happened. For example, if a reduction rate falls below a threshold, or any other trigger may be activated, the device 140 may start recording sensor data of 8 seconds around the suspected event (e.g. an accident) and use this data in an inference method to label the event. The sensor data may be recorded in compressed form as discussed above with respect to FIG. 3. The sensor data may be from a single sensor, thus comprising a signal from that sensor, or it may comprise sensor data of multiple sensors, thus comprising signals from these sensors. For example, the sensor data may comprise three components of acceleration (from an acceleration sensor), i.e. in x-, y-, and z-direction, and further may comprise three components of a gyroscope, i.e. roll, pitch, yaw. In this case the sensor data would be comprised of 6 signals, one per each component of the two sensors. In the example with an accelerometer with 3 axis and a gyroscope with 3 components there may be 1600 data points per axis/component of the sensor, resulting in a total of 6×1600 data points=9600 data points. The sensor data may be loaded into the inference method. Before further processing the recorded data, the data may be decompressed/decoded using the encoding dictionary.

In an additional optional step 420a, derived signals may be determined from the sensor data. In the example with the accelerometer and gyroscope, the magnitude of the acceleration may be derived. Furthermore, as another derived signal, the increments between neighbouring data points in a signal may be determined, i.e. new (differential) signal $\Delta x_i = x_i - x_i - 1$ for i=2 to N, wherein $\Delta x_i = \Delta x_2$, and $x_i$ denotes a component of signal vector x (e.g. x-component of accelerometer, or yaw of gyroscope).

In another optional step 430a, signals of the sensor data may be smoothened. For example, by applying an averaging operation to the (derived and original) signals of the sensor data. This averaging operation may be a moving average. The window size of the moving average may be 60.

In another step 440a, (aggregated) features may be computed from the signals of the sensor data. Since the signals generally may comprise time series data, the computed features may be statistical measures of these signals. The computation of a feature may reduce the data of a signal vector (comprising for example N=1600) into a single number.

These features may be the kurtosis, the mean value, the standard deviation for the signals (including the new signals derived in the previous step) in this method. Further examples for computed features are the amplitude for the (time series) signal, i.e. difference between maximum and minimum value in the signal; the ratio of the standard deviation to the amplitude of the (time series) signal.

In another optional step 450a, some of the above computed features may be log-transformed. This may be achieved by replacing the value a of a feature with $\log(|a|+1)$. Other logarithmic transform may also be applied instead of the aforementioned example.

By placing each of the computed features (regardless whether additionally log-transformed or not) into a new vector, a feature vector may be formed and/or provided to the process 400b, step 460a. Therein, each component of the feature vector may be one of the features computed in the aforementioned steps.

FIG. 4b illustrates a method/process 400b for making a prediction from feature vectors obtained from the (compressed) sensor data. This process may be performed subsequently to process 400a, after the feature vector is formed or provided. The method may be performed in the device 140 at the vehicle (in real-time). In step 410b, model parameters of the classifier obtained from the training phase may be loaded. Such model parameters may constitute a prediction model. The prediction model may be used to label the sensor data or sparse representation with a classification. An example for the classification may be that the data is associated with an anomalous event, such as an accident. Optionally or additionally, the feature vector is replaced by a normalized feature vector. A vector of feature means and a vector of feature standard deviations may be available to the process from model parameters obtained from a training phase of the classifier. In the normalized feature vector the mean of every feature is subtracted and divided by the standard deviation.

In step 420b, a margin M may be computed. The margin may be the distance of a data point in question from the Support Vector Machine decision boundary. The margin M may be computed according to the following equations:

$$M = \sum_{k=1}^{N_s} \alpha_k K(f', x_k) + b_0 \text{ and}$$

$$K(x, y) = e^{-\gamma \|x-y\|^2}, \|x\|^2 = \sum_{i=1}^{N_f} x_i^2$$

wherein $b_0$ is the intercept term, y is the kernel parameter, f' denotes the normalized feature vector with its components $f'_1$ to $f'_{N_f}$, wherein $N_f$ denotes the number of features (=length of the feature vector), $\alpha_k$ denotes a component of the dual coefficients $\alpha_1$ to $\alpha_{N_s}$, $N_s$=number of support vectors, $x_k$ denotes the k-th support vector from the array of support vectors $x_1$ to $x_{N_s}$. As indicated above, the dual coefficients, the support vectors, the intercept term, or the kernel parameter may be part of a classifier model of the support vector machine and may be obtained from a training phase of the classifier.

In step 430b, a classification of the data point in question (this is the suspected event for which sensor data was recorded) may be made. This classification may comprise comparing the computed margin M to a margin threshold M0. The margin threshold M0 may be obtained with other model parameters. If the margin M exceeds M0 the datapoint may be assigned/classified as belonging to the first class, or vice versa. For example, as a conclusion, it may be determined whether the sensor data recorded around the event is associated with an accident (or any other noteworthy anomaly in the operation of the vehicle). For example, if the computed margin M falls below the threshold margin M0, the suspected event may be classified as a "False Crash", and otherwise as a "True Crash".

In an optional step 440b, the result of the classification (label of the sensor data) may be provided together with the sensor data underlying to the classification to a remote computing environment. At the remote computing environment, the received sensor data with the label may be used/stored as training data for further (event) classification models.

According to another aspect of the invention, anomalies in the sensor data/signals generally may indicate an event of interest, such as an accident, a need for maintenance of the vehicle, malfunctioning parts of the vehicle, or a tiredness of the driver/operator of the vehicle (where a change of operation of the vehicle would be an appropriate action to take). These (anomaly) events may be stored separately and used in subsequent trigger processes, e.g. a camera or a LIDAR used to detect the environment around the event. The reduced coefficients could be directly transferred to a sensor fusion unit (such as server 100) and be combined with reduced coefficients extracted from a camera or LIDAR device associated with the vehicle based on an equivalent methodology and used to trigger an event detection.

The dictionary encoding may be used for detecting an anomaly. As the (encoding) dictionary is trained on historical data, which include some recurrent patterns, (original) signals deviating strongly from the historical data will result in low reduction rates, when compressed encoded with the dictionary. In other words, abnormally low reduction rates for a compressed signal may indicate the (original) signal comprises signal patterns that were previously not learned/taken into account of (by the dictionary). Thus, it is likely that the signal contains data from an anomaly (accident, etc.). Upon detection that the reduction rate R falls below a threshold value qr, the device may be directed to further inspect the (compressed or uncompressed) signal to further classify the sensor data or determine what caused the anomaly. For this, any of the routines disclosed herein for performing data analytics on the (compressed) signals may be used.

In some applications, it is desired to optimize the reduction rate, because it is critical to have high reduction rates in all types of signals (containing an anomaly or not). According to another embodiment, which may be combined with the above embodiment, the reduction rate R may be used as a trigger to identify new training data for the (encoding) dictionary. If it is determined or detected that the reduction rate of the compressed signal falls below the threshold value qr, the device may then provide the compressed signal y (or respective original signal x) to a remote computing environment (such as a cloud computing environment) as a further training data sample. Optionally, the respective compressed signal may be marked as a new training data sample, if it is not directly provided to the remote computing environment. Instead, the compressed signal may be stored in the device until the signal is collected from the device during a maintenance procedure. In any case, then, the new training data sample may be used in a (sparse) dictionary learning routine, as discussed above, to improve the dictionary (already in use). This is possible because, in general, a dictionary learning routine starts with an initial guess for the dictionary, when a new dictionary is to be learned from training data. In the discussed case, this initial guess for the learning routine may be the dictionary already in use in the vehicle that resulted in the reduction rate falling below the threshold value.

Figure 5:
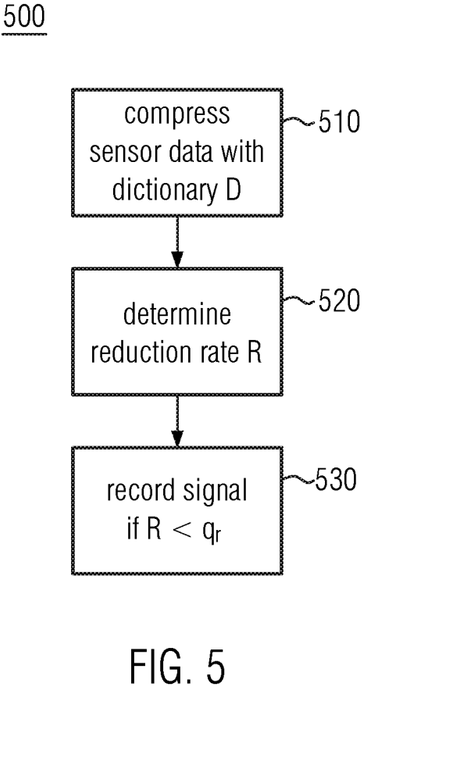
FIG. 5 illustrates a method for determining whether a suspected event has happened based on the compressed sensor data.

FIG. 5 illustrates a method/process for determining whether a suspected event has happened based on the compressed data (=sparse representation) (according to FIG. 3).

In step 510, raw sensor data may be compressed with an (encoding) dictionary, as described in method 300, resulting in a compressed data (signal). For example, the original signal vector may be compressed into a compressed signal vector y.

In step 520, a reduction rate R may be determined for the compressed data (=sparse representation). The reduction rate R may be defined as the ratio of non-zero components/elements in the compressed signal (vector) over the total number of components in the compressed signal (vector). As a formula: reduction rate R=(number of zero components in the compressed signal vector)/(length N of compressed signal vector).

In step 530, if the reduction rate R falls below a threshold value $q_r$, the signal may be recorded to further classify it, for example by using a process to 400a and 400b described above.

According to an embodiment, vehicles may exchange one or more atoms of their dictionary. This is desirable, when a first vehicle has a dictionary that works well, because it is in use for a long time (thus the amount of processed data is large). Another second vehicle, which has only recently started to use the discussed dictionary encoding may have lower reduction rates, because the dictionary is not as well trained as for the first vehicle. One way to improve the situation could be to replace the dictionary in use in the second with the first vehicle's dictionary. However, such dictionary exchange is costly as it requires to transfer an entire dictionary. To improve this situation, it is possible to exchange one or more atoms (columns) of the dictionary from the first vehicle, instead of the entire dictionary. In the following, several embodiments for an exchange of dictionary atoms (also referred to as dictionary columns) are introduced.

The basic scheme for the exchange of a dictionary atom (hereafter shortly: atom) involves two vehicles: A first vehicle providing or sending an atom from its dictionary. And a second vehicle receiving the dictionary atom of the first vehicle.

The scheme for the exchange of a dictionary atom may also involve finding an atom in the receiving (second) vehicle's dictionary. The atom that is used the least to encode/compress signals may be dropped or replaced in the second vehicle's dictionary. The least used atom can be determined by keeping statistics about which atom is used how often to encode/compress a signal. Such statistical analysis may provide the frequency of use for all or some atoms of a vehicle's dictionary. Alternatively, one may say that an atom from the first vehicle's dictionary that is to replace an atom of the second vehicle's dictionary is searched.

Figure 6A:
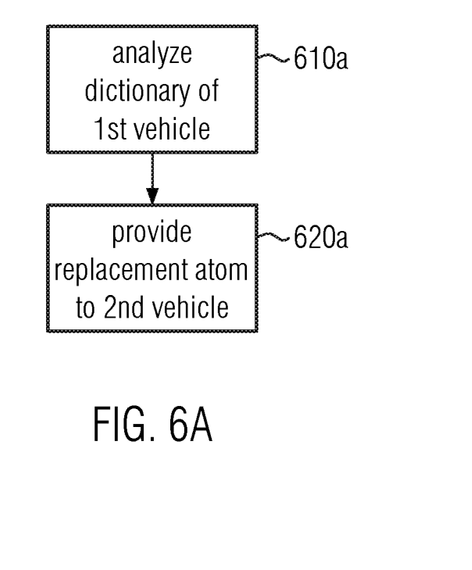
FIGS. 6a and 6b illustrate methods for the exchange of an atom of a dictionary between two vehicles.

FIG. 6a illustrates a process/method for the exchange of an atom of an encoding dictionary from the perspective of a first vehicle providing the atom. The process illustrated herein may alternatively be performed at a remote computing environment if the dictionary and the frequency of use of the atoms of the dictionary is available to the remote computing environment.

According an embodiment, in step 610a, the dictionary of the first vehicle may be analyzed (at the first vehicle) using the indications for the frequency of use of the atoms in the dictionary, and then determine which atom of the dictionary may is beneficial for replacing an atom in the second vehicle's dictionary. For example, the first vehicle may determine whether the frequency of use of an atom in the first vehicle's dictionary exceeds a threshold value p. doing so, a potential replacement atom A of the first dictionary may be determined. In step 620a, the first vehicle may provide the replacement atom A to the second vehicle. Alternatively, when the first vehicle omits the determination of the replacement atom A, it may provide its entire dictionary and an indication for the frequency of use of the atoms of the dictionary to the second vehicle. In another alternative, a remote computing environment (cloud computing environment) may perform the task described in this paragraph, i.e. the replacement atom A is determined in the cloud and send from the cloud to the second vehicle, or the cloud may send the first vehicle's dictionary and the indication for the frequency of use of the atoms of the dictionary.

Figure 6B:
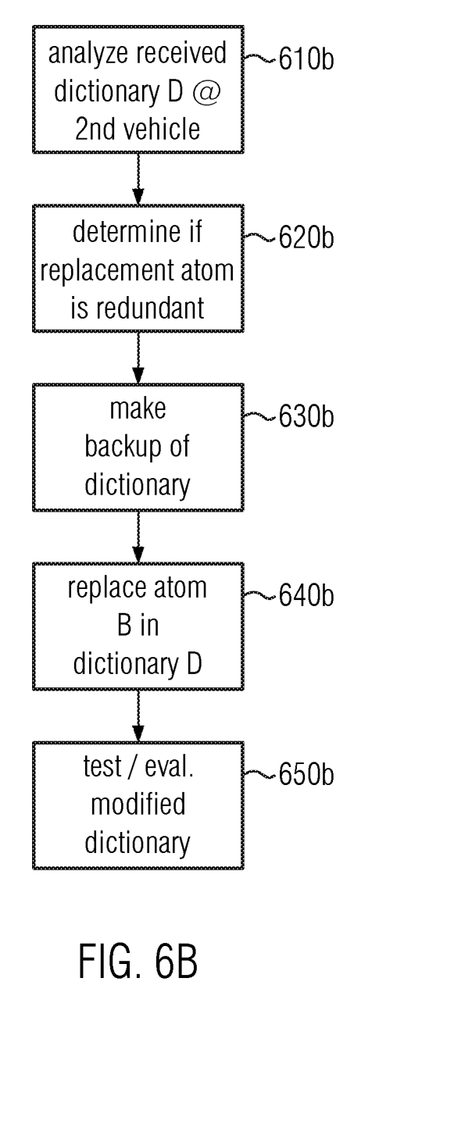

FIG. 6b illustrates a process/method for the exchange of an atom of an encoding dictionary from the perspective of a second vehicle receiving/inserting the atom in its dictionary.

According to an embodiment, a second vehicle may receive an (encoding) dictionary of a first vehicle. The second vehicle may receive the dictionary directly from the first vehicle, for example, through vehicle-to-vehicle communication, or through a proxy, or from a remote computing environment (cloud computing environment) that has a copy of the first vehicle's dictionary. In addition to the dictionary, the second vehicle may also receive indication(s) for the frequency of use of the atoms of the received dictionary. The indications may relate to all atoms of the received dictionary, or the indication may only relate to a subset of the atoms of the dictionary. In step 610b, the second vehicle may then analyze the received dictionary using the indications for the frequency of use of the atoms of the dictionary, and then determine which atom of the received dictionary may be used to replace an atom of the second vehicle's own dictionary. For example, the second vehicle may determine a frequency of use of an atom of the first vehicle's dictionary exceeds a threshold value p. Doing so, a potential replacement atom A of the first dictionary may be determined. The second vehicle may use this comparison in order to find an atom of the dictionary that may be inserted into the second vehicle's dictionary. In an alternative embodiment, in step 610b, the second vehicle need not to determine the replacement atom A itself, because it receives the replacement atom A from the first vehicle or a remote computing environment (cloud computing environment).

According to a further aspect for replacing an atom of the dictionary, in step 620b, the second vehicle may determine whether the (potential) replacement atom A is not redundant in view of the current second vehicle's dictionary. As such, it is verified whether the replacement atom A would add new information that is currently not present in the second vehicle's dictionary. For example, it may be determined that the norm of the difference of A and a projection of A on a subspace spanned by all atoms (or component vectors) of the second vehicle's dictionary is above a threshold value q. This can be performed by the second vehicle again. If the replacement atom A fulfills the aforementioned two conditions, it may be used to replace an atom from the second vehicle's dictionary. In another (processing) step, it may be determined which atom of the second vehicle's dictionary may be replaced or dropped for the replacement atom. For example, the second vehicle may determine which atom in its own dictionary is used the least for encoding/compressing signals. The second vehicle may determine this by book-keeping/counting which indices of the compressed signal vectors are most of the times zero. Alternatively, the second vehicle may use a threshold value s and determine using the threshold value s which atom to drop/replace from its dictionary. For example, the second vehicle may determine to drop/replace an atom of its dictionary wherein the atom's frequency of use in the encoding/compressing of signals falls below the threshold value s. Doing so, the atom B that is to be replaced in the second vehicle's dictionary may be determined. In step 640b, the second vehicle may then proceed to replace the atom B in its dictionary with the atom A determined in one of the previous steps. For example, atom A may be replaced in-place for atom B in the second vehicle's dictionary. Alternatively, atom B may be first dropped from the second vehicle's dictionary (resulting in a temporary reduced dictionary), and then atom A may be inserted into the reduced dictionary, so that the dimension of the dictionary is restored to its state before dropping atom B. Before modifying the second vehicle's dictionary, in step 630b, a backup of the dictionary may be made at the second vehicle or at a remote computing environment. Alternatively, it may suffice to make a backup of the atom B that is to be replaced in step 630b.

Optionally or additionally, in step 650b, after adding the atom A in the second vehicle's dictionary, the (new) dictionary of the second vehicle may be evaluated/tested. For example, the second vehicle may determine whether the average reduction rate is improved in comparison to the previous dictionary in use or use a compressed signal (vector) determined with the new dictionary to detect an event. If the reduction rate using the new dictionary is improved in comparison to the previous dictionary, the modification (update) to the dictionary (insertion of atom A) may be preserved, otherwise the modification (update) may be reverted, so that the previous dictionary becomes active again.

In the following, another embodiment for the exchange of a dictionary atom between two vehicles is described, in which some of the above described steps may be performed in a remote computing environment or the first vehicle. According to this embodiment, the (encoding) dictionary of the second vehicle, which is to receive the replacement atom from the first vehicle's dictionary, is accessible/available to the first vehicle or the remote computing environment. Optionally the frequency of use of the atoms of the first vehicle's dictionary and/or the second vehicle's dictionary are accessible/available to the first vehicle or the remote computing environment. The first vehicle may find an atom of its dictionary that is appropriate for inserting into another vehicle's dictionary (e.g. the second vehicle).

The first vehicle may start to look for a replacement atom, i.e. an atom of its dictionary to be inserted into a second vehicle's dictionary. The first vehicle may analyze its dictionary using the indications for the frequency of use of the atoms in the dictionary, and then determine which atom of the dictionary is beneficial for replacing an atom in the second vehicle's dictionary. For example, the first vehicle may determine whether the frequency of use of an atom in the first vehicle's dictionary exceeds a threshold value p. When the threshold is exceeded, a potential replacement atom A of the first dictionary may be determined/detected.

Furthermore, the first vehicle may determine whether the (potential) replacement atom A is not redundant in view of the second vehicle's current dictionary. As such, it is verified whether the replacement atom A would add new information that is currently not present in the second vehicle's dictionary. For example, it may be determine that the norm of the difference of A and a projection of A on a subspace spanned by all atoms (or component vectors) of the second vehicle's dictionary is above a threshold value q. In an additional step, the first vehicle may determine which element is to be replaced in the second vehicle's current dictionary.

The first vehicle may use a threshold value s and determine using the threshold value s which atom to drop/replace from the second vehicle's dictionary. For example, the first vehicle may determine to drop/replace an atom of the second vehicle's dictionary wherein the atom's frequency of use in the encoding/compressing of signals falls below the threshold value s. If the atom's frequency of use in the encoding/compression of signals falls below the threshold value s, the atom B that is to be replaced in the second vehicle's dictionary may be determined.

The first vehicle may then compose a new dictionary that is to replace the current dictionary of the second vehicle. For example, the first vehicle may insert the replacement atom A in the place of the atom B in the second vehicle's dictionary (or a copy thereof which is accessible/available to the first vehicle). The first vehicle may then provide the (new) replacement dictionary to the second vehicle that will then replace its local copy of its dictionary with the received replacement dictionary. The second vehicle may then replace its dictionary with the received dictionary and start using the replacing dictionary for improving the compression of signals of sensors.

Alternatively, the first vehicle may send the replacement atom A to the second vehicle. In addition or at the same time, the first vehicle may send an indication of the atom B that is to be replaced in the second vehicle's dictionary to the second vehicle.

In response to receiving the replacement atom A, the second vehicle may determine which element to drop/replace in its current dictionary. The second vehicle may use a threshold value s and determine using the threshold value s which atom to drop/replace in the second vehicle's dictionary. Alternatively, if the second vehicle received the replacement atom A and an indication of the atom B that is to be replaced, the second vehicle may skip the step of determining the atom B that is to be replaced, and instead (directly) proceed to replacing the atom B in its dictionary with the replacement atom A. As an alternative to replacing atom B with atom A in-place, the second vehicle may first drop atom B from its dictionary and then insert atom A into the dictionary. Furthermore, the second vehicle may then evaluate whether the update of its dictionary is worth keep. For this, the second vehicle may test the performance of the compression of signals with the updated (encoding) dictionary by tracking whether the average reduction rate improved (e.g., increased). If so, the second vehicle may keep the updated dictionary, otherwise it may revert back to the previously used dictionary, because the second vehicle has a backup of the previous dictionary or an indication where replacement atom A is in the updated dictionary and a backup of the replaced atom B.

The steps described above with respect to the first vehicle may be equally performed by the remote computing environment instead of the first vehicle (assuming one or more of the following elements: first vehicle's dictionary, the frequency of use of the atoms of the first vehicle's dictionary, the second vehicle's dictionary and the respective frequency of use for the atoms of the second vehicle's dictionary are available/accessible to the computing environment).

The invention claimed is:

1. A computer-implemented method for processing sensor data, comprising:
receiving sensor data from a sensor associated with a vehicle, the sensor data comprising a plurality of data values;
determining a sparse representation of the received sensor data using a sparse-approximation technique, the sparse-approximation technique using a dictionary and an error control parameter, wherein determining the sparse representation comprises:
generating candidate sparse representations of the sensor data based on the dictionary;
selecting one of the candidate sparse representations as the sparse representation, wherein the selected candidate sparse representation meets the criteria:
each of the error differences between the data values of the sensor data from corresponding decoded data values of the selected candidate sparse representation meet the error control parameter; and
detecting an event from the sparse representation.

2. The method of claim 1, wherein each error difference is calculated as an absolute value of a difference.

3. The method of claim 1, further comprising:
determining the corresponding decoded data values of the selected candidate sparse representation by decoding the selected candidate sparse representation with the dictionary.

4. The method of claim 1, wherein detecting the event from the sparse representation comprises:
computing a reduction rate of the sparse representation with respect to the received sensor data;
detecting the event, when the reduction rate does not meet a threshold value.

5. The method of claim 1, wherein detecting the event from the sparse representation comprises:
extracting a feature vector from the sparse representation of the sensor data;
applying a prediction model to the feature vector, wherein a margin is computed and compared to a threshold margin;
detecting the event, when the computed margin exceeds the threshold margin;
labelling the sensor data or the sparse representation according to a classification of the prediction model.

6. The method of claim 5, comprising:
upon labelling the sensor data, providing the sensor data to a remote computing environment as training data; or
upon labelling the sparse representation, providing the sparse representation to a remote computing environment as training data.

7. The method of claim 1, wherein the sparse representation comprises a plurality of reduced coefficients;
wherein detecting the event from the sparse representation comprises:
detecting the event, when a combination of the reduced coefficients of the sparse representation meets a criterion indicating an anomalous event of the vehicle or condition of the vehicle.

8. The method of claim 1, further comprising:
upon detecting the event from the sparse representation, providing the sensor data or sparse representation to a remote computing environment as training data;
determining a new dictionary based on a training data set using a dictionary learning scheme, wherein the training data set comprises the training data.

9. A sensor data processing system for a vehicle, comprising means for:
receiving sensor data from a sensor associated with the vehicle, the sensor data comprising a plurality of data values;
determining a sparse representation of the received sensor data using a sparse-approximation technique, the sparse-approximation technique using a dictionary and an error control parameter, wherein the determining the sparse representation comprises:
generating candidate sparse representations of the sensor data based on the dictionary;
selecting one of the candidate sparse representations as the sparse representation, wherein the selected candidate sparse representation meets the criteria:
each of the error differences between the data values of the sensor data from corresponding decoded data values of the selected candidate sparse representation meet the error control parameter; and
detecting an event from the sparse representation.

10. The sensor data processing system for a vehicle of claim 9, further comprising:
means for providing the sensor data or sparse representation to a server as additional training data, upon detecting the event from the sparse representation; and
a server configured to:
determine a new dictionary based on a training data set including the provided training data by using a dictionary learning scheme; and
distribute the new dictionary to the vehicle.

11. A server for processing sensor-based data of one or more vehicles, the server being configured to:
receive a sparse representation of sensor data associated with a vehicle, the sparse representation being encoded with a dictionary according to a sparse approximation technique;
determine a new dictionary based on a training data set using a dictionary learning scheme, wherein the training data set comprises the received sparse representation as training data; and
distribute the new dictionary to one or more vehicles;
wherein the received sparse representation of sensor data is received from a first vehicle; and
the server being further configured to:
receive a second sparse representation of sensor data associated with a second vehicle, the second vehicle being different from the first vehicle; and
detect an event from a combination of the received sparse representation of sensor data associated with first vehicle and the received sparse representation of sensor data associated with the second vehicle.

12. The server according to claim 11, wherein determining the new dictionary is further based on the detected event.

* * * * *